United States Patent
Luo et al.

(10) Patent No.: US 10,992,693 B2
(45) Date of Patent: Apr. 27, 2021

(54) NEAR REAL-TIME DETECTION OF SUSPICIOUS OUTBOUND TRAFFIC

(71) Applicant: Microsoft Technology Licensing, LLC, Redmond, WA (US)

(72) Inventors: Pengcheng Luo, Cambridge, MA (US); Reeves Hoppe Briggs, Boxborough, MA (US); Bryan Robert Jeffrey, Littleton, MA (US); Marco DiPlacido, Waltham, MA (US); Naveed Ahmad, Medford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 15/428,810

(22) Filed: Feb. 9, 2017

(65) Prior Publication Data

US 2018/0227322 A1    Aug. 9, 2018

(51) Int. Cl.
 *G06F 11/00* (2006.01)
 *H04L 29/06* (2006.01)

(52) U.S. Cl.
 CPC ...... *H04L 63/1425* (2013.01); *H04L 63/1416* (2013.01)

(58) Field of Classification Search
 CPC ............. H04L 63/1416; H04L 63/1425; H04L 63/1441; H04L 63/145; H04L 63/1408; H04L 63/1433; G06F 21/577; G06F 21/55; G06F 21/566
 See application file for complete search history.

(56) References Cited

U.S. PATENT DOCUMENTS

| | | | |
|---|---|---|---|
| 7,512,980 B2 * | 3/2009 | Copeland | H04L 63/1416 705/51 |
| 8,079,080 B2 | 12/2011 | Borders | |
| 8,117,657 B1 | 2/2012 | Elrod et al. | |

(Continued)

FOREIGN PATENT DOCUMENTS

WO    2016048539 A1    3/2016

OTHER PUBLICATIONS

Marchetti, et al., "Analysis of High Volumes of Network Traffic for Advanced Persistent Threat Detection", In Journal of Computer Networks, vol. 109, Part 2, Nov. 2016, pp. 127-141.
Marchetti, et al. "Countering Advanced Persistent Threats through Security Intelligence and Big Data Analytics", In IEEE 8th International Conference on Cyber Conflict, May 31, 2016, pp. 243-261.
"International Search Report and Written Opinion Issued in PCT Application No. PCT/US2018/016535", dated Apr. 3, 2018, 15 Pages.

(Continued)

*Primary Examiner* — Maung T Lwin
*Assistant Examiner* — Lizbeth Torres-Diaz
(74) *Attorney, Agent, or Firm* — Shook, Hardy & Bacon, L.L.P.

(57) ABSTRACT

Detecting emergent abnormal behavior in a computer network faster and more accurately allows for the security of the network against malicious parties to be improved. To detect abnormal behavior, outbound traffic is examined from across several devices and processes in the network to identify rarely communicated-with destinations that are associated with rarely-executed processes. As a given destination and process is used more frequently over time by the network, the level of suspicion associated with that destination and process is lowered as large groups of devices are expected to behave the same when operating properly and not under the control of a malicious party. Analysts are alerted in near real-time to the destinations associated with the activities deemed most suspicious.

20 Claims, 5 Drawing Sheets

(56) References Cited

U.S. PATENT DOCUMENTS

| | | |
|---|---|---|
| 8,499,348 B1 | 7/2013 | Rubin |
| 9,088,598 B1 | 7/2015 | Zhang et al. |
| 9,380,071 B2 | 6/2016 | Liljenstam et al. |
| 9,483,742 B1 | 11/2016 | Ahmed |
| 9,503,468 B1 | 11/2016 | Yen et al. |
| 9,516,053 B1 | 12/2016 | Muddu et al. |
| 10,291,637 B1* | 5/2019 | Bardenstein ........ H04L 63/1408 |
| 10,498,755 B2* | 12/2019 | Harris ................. H04L 61/1511 |
| 2005/0210533 A1* | 9/2005 | Copeland ............ H04L 63/1441 |
| | | 726/23 |
| 2007/0033645 A1 | 2/2007 | Jones |
| 2017/0339187 A1* | 11/2017 | Papamartzivanos ......................... |
| | | H04L 63/1425 |
| 2018/0227322 A1* | 8/2018 | Luo ..................... H04L 63/1425 |
| 2019/0245876 A1* | 8/2019 | Faigon ................ H04L 63/1416 |
| 2020/0021607 A1* | 1/2020 | Muddu ................. G06F 16/444 |

OTHER PUBLICATIONS

Rice, et al., "Command-and-control servers: The puppet masters that govern malware", http://searchsecurity.techtarget.com/feature/Command-and-control-servers-The-puppet-masters-that-govern-malware, Published on: Jun. 2014, 7 pages.

"Cyber Security", http://cyber.verint.com/download/, Published on: Nov. 29, 2016, 13 pages.

"Cisco Secure Data Center for Enterprise", http://www.cisco.com/c/en/us/td/docs/solutions/Enterprise/Security/SDC/DG/SDC_DesignGuide/SDC_DG_2013-11-25_v10.html, Published on: Dec. 7, 2013, 41 pages.

"Office Action Issued in European Patent Application No. 18706343.3", dated Jun. 24, 2020, 5 Pages.

\* cited by examiner

NEAR REAL-TIME DETECTION OF SUSPICIOUS OUTBOUND TRAFFIC

BACKGROUND

Computer networks are under near constant attacks from malicious parties. These malicious parties, once they gain access to a network will generate outbound traffic to communicate outside of the compromised network for various purposes, such as when sending communications to a command and control center or exfiltrating data to another device outside of the network. Communications to known command and control centers may be blocked by blacklists (or outbound communications restricted to whitelists), but identifying new command and control centers is difficult and time consuming, allowing the malicious party unfettered access to compromised devices in the network until an exploit or intrusion is recognized so its outbound destination can be added to a blacklist.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying processor executable instructions for near real-time detection of suspicious outbound traffic are provided herein. Netflow and process signals are gathered from the devices within an online service connected to a device outside the online service to identify anomalous outbound traffic. Individual connections and destinations are scored relative to how anomalous they are in a pipeline. Emergent abnormal behaviors are detected and brought to the attention of security analysts for the online service in near real-time without the use of a blacklist. Additionally, emergent abnormal behaviors are differentiated from widespread behaviors, thus reducing the prevalence of and user fatigue associated with dealing with false positives in detecting malicious outbound traffic.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
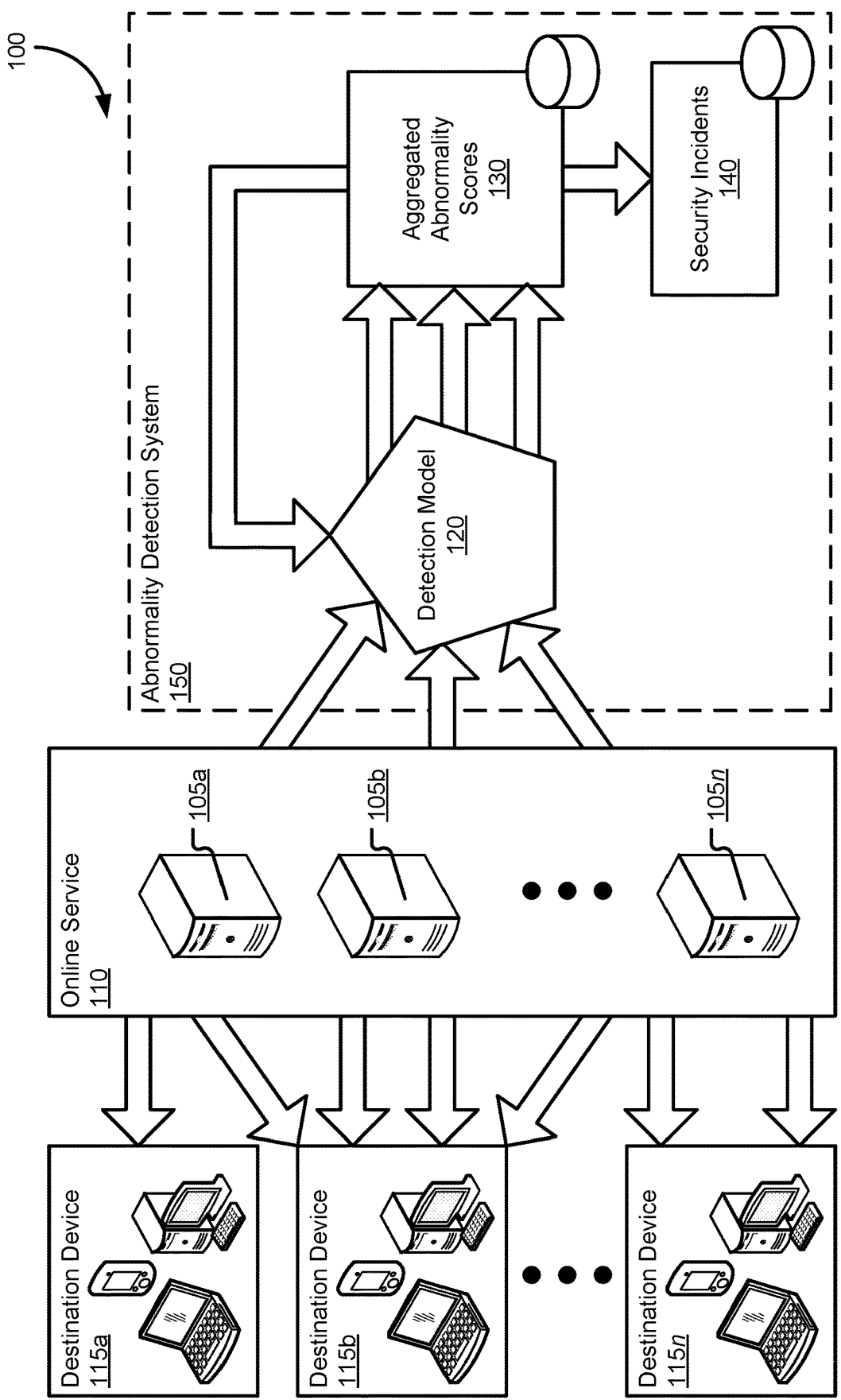
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Detecting abnormal behavior in a computer network as it emerges allows for the network to be secured against malicious parties faster and more efficiently, thus addressing the computer-centric problem of network security and improving the functionality of the devices within the network. To detect abnormal behavior, outbound traffic is examined from across several devices and processes in the network to identify rarely communicated-with destinations that are associated with rarely-executed processes, and analysts are alerted in near real-time to the devices associated with the activities deemed most suspicious. When an emergent abnormal behavior is observed in the network, the affected devices may be quarantined, observed to learn more about the malicious party, or repaired to return to proper functionality. As a given destination and process is used more frequently over time by the network, the level of suspicion associated with that destination and process is lowered as large groups of devices are expected to behave the same when operating properly (i.e., when they are not under the control of a malicious party).

Examples given in the present disclosure may refer to values used to how "suspicious" a given action is, which indicates a determined likelihood that a particular action is malicious. Although the values of more suspicious actions will generally be described as "higher" than less suspicious actions in the present disclosure, one of ordinary skill in the art will appreciate that in other aspects, an opposite polarity of suspiciousness values may be used, where "lower" values are deemed more suspicious.

FIG. 1 illustrates an example environment 100 in which the present disclosure may be practiced. An online service 110 is made up of a plurality of source devices 105 (e.g., first source device 105a, second source device 105b, ... nth source device 105n), which communicate with various destination devices 115 (e.g., first destination device 115a, second destination device 115b, ... nth destination device 115n) outside of the online service 110. Network trace information and process event information related to the outbound communications are provided to a detection model 120, which scores the outbound communications based on a rolling windowed analysis of the destination devices 115 and the processes of the online service 110. The scores are combined and aggregated for use as aggregated abnormality scores (stored in an aggregated abnormality scores cache 130), which are used by the detection model 120 in analyzing future outbound communications and are provided as security incidents (stored in a security incident cache 140) for use by one or more analyst users. In various aspects, the detection model 120, aggregated abnormality score cache 130, and security incident cache 140 are referred to collectively as an abnormality detection system 150.

The source devices 105, online service 110, destination devices 115, and abnormality detection system 150 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 3-4B.

While the source devices 105, online service 110, destination devices 115, and abnormality detection system 150 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The online service 110 represents a networked set of computing source devices 105, such as a cloud data center, that provides "cloud" services to various users, including, but not limited to: Infrastructure as a Service (IaaS), where the user provides the operating system and software running on the source devices 105 of the online service 110; Platform as a Service (PaaS), where the user provides the software and the online service 110 provides the operating system and source devices 105; or Software as a Service (SaaS), where the online service 110 runs both the operating system and software provided to the users. The users who seek to access the online service 110 may be legitimate users or malicious parties, who exploit security vulnerabilities to intrude upon the online service 110 to run unauthorized processes and/or retrieve data from the online service 110 without legitimate authorization.

For the malicious parties to take advantage of unauthorized access, the compromised source devices 105 in the online service 110 will generate outbound messages, directed to various destination devices 115. The destination devices 115 may be identified via an Internet Protocol (IP) address to which to route communications, a domain name (which may be used in combination with a Domain Name System (DNS) to yield an IP address), or other addressing scheme. When an outbound signal to a destination device 115 is detected, a connection event is generated for consumption by the detection model 120. The connection includes event information from a network trace as well as information about the source device 105 and processes running on the source device 105 at the time of outbound communication. For example, the connection event may include, but is not limited to, one or more of: an identifier for the source device 105, a type or role of the source device 105, a user of the source device 105, a process that generated the outbound communication, a time at which the outbound communication was generated, an IP address for the destination device 115, a port for the destination device 115, a host for the destination device 115, a protocol of the outbound communication, a size in bytes of the outbound communication, and the like.

The detection model 120 receives the event information and probabilistically determines whether the event represents abnormal behavior for the online service 110. As the online service 110 may contain a myriad of machines engaging in outbound communications, it is expected that similar behaviors will be seen from large groups of those machines during normal operation, and dissimilar or one-off behaviors (i.e., aberrations or abnormal behavior) are therefore worthy of greater attention to determine whether the abnormal behavior is malicious in nature or benign, albeit unusual.

The probabilities of various feature pairs are examined by the detection model 120 to determine whether an event is abnormal. The probability that an event includes feature A given that feature B is observed is used to produce an abnormality score for each event type based on its frequency of being observed. In various aspects, a threshold filter is used to exclude very low frequency events from examination (at least temporarily) so that inaccurate estimates of their probability are not made. In one example, recent events are "debounced" so that if the first event (from a first source device 105a at a first time) for an event type that will eventually become more common as time progresses is observed, additional source devices 105 are given time to produce similar events before the first event is examined. In a second example, a population threshold is set for the modeled probabilities so that a probability of zero is assigned if the population of events is too small to provide reliable results. In a third example, a subpopulation threshold is set for the modeled probabilities so that a probability of zero is assigned if a subpopulation of events (e.g., those events sharing a given feature pair) is too small to provide reliable results in estimating a probability for that subpopulation.

Examples of feature pairs that the detection model 120 examines include, but not limited to: the destination device 115 and process generating the outbound communication, the process and the role of the source device 105, the destination host and the role of the source device 105, the destination host and process, and the destination host and the role of the source device 105.

In the above examples, the role of the source device 105 from which the outbound communication was generated defines a type and a function of the source device 105 within the online service 110 (e.g., directory server, client application front-end server). In various aspects, the process generating the outbound communication may be the program or sub-application requesting the outbound communication, a user/program pair, or a service of the source device 105 handling the request on behalf of a user.

Feature pairs that include the feature of "destination host" will resolve the outbound communication's destination IP address via a reverse DNS lookup into the host name. In aspects where the IP address resolves into multiple destination hosts (e.g., IP address aaa.bbb.ccc.ddd may resolve into www.example.com, mail.example.com, cloud.example.com, etc.), the destination host with the highest probability based on previous pairings will be selected as the destination host. For example if the Host A and Host B are the domain hosts returned via a reverse DNS lookup for combination with Feature X, the probabilities for [Host A|X] and [Host B|X] will be examined, and the host name from the feature pair with the higher probability, as determined by the detection model 120, will have its destination host selected.

The abnormality score generated by the detection model 120 is produced from the probability scores of all of the examined feature pairs for an event. For example, the probabilities of seeing feature pairs or [A|B], [B|C], [B|D], and [D|A] from a given event are combined to produce the abnormality score for the given event. In various aspects, a sigmoid squashing function is applied to the combined probabilities to ensure a bounded range of abnormality scores.

The abnormality scores are aggregated according to the destination device 115 (e.g., by IP address, host identifier, or MAC address) for later analysis and updating the detection model 120. The aggregated abnormality scores are cached in a database or list structure in the aggregated abnormality score cache 130. In various aspects, the aggregated abnormality scores are fed back into the detection model 120 to make further determinations of abnormality based on previously seen behavior (i.e., the historic "spreadness" of behavior in the online service 110) and to update the detection model 120 based on the most recent observed behaviors. In some aspects, the abnormality scores that are aggregated in the aggregated abnormality score cache 130 are stored and periodically aged out of storage according to a rolling window of time so that older observations are removed from consideration in the aggregated scores.

A second set of features (e.g., spread features) are used to examine the aggregated abnormality scores to determine which to elevate for analysis by a security analyst or other administrative user. Spread features include one or more of: a number of unique ports used to connect to a given destination IP address, a number of unique source devices 105 communicating with the given destination IP address, and a number of unique processes communication with the given destination IP address.

The spread features are combined according to various formulas with the greatest observed aggregated abnormality score for a given destination IP address to provide an incident score, which is compared against an incident threshold to determine whether to examine the behavior when the incident score satisfies the incident threshold. The formula is set such that as a behavior becomes more widespread, the incident score is less likely to satisfy the incident score. A higher greatest observed aggregated abnormality score supports satisfying the incident threshold, whereas a higher spread feature score inhibits the satisfying the incident threshold. In various aspects, the incident threshold is a pre-set value that incident scores are to satisfy, while in other aspects, is a percentile value, so that at least n % of the events observed will satisfy the incident score.

The behaviors that are determined to satisfy incident thresholds are provided to the security analysts from the security incident cache 140 as various alerts of security incidents. The security incidents are stored in a database or list structure in the security incident cache 140 for analysis and remediation by analyst and other administrative users. In various aspects, an alert is generated and transmitted to an analyst detailing why a given behavior was categorized as a security incident, affected machines and processes in the online service 110, destination device 115, etc. An alert may be transmitted to a SIEM (Security Information and Event Management) system (as an application message), an email account (as an email), a cellphone (as a text or multi-media message), a pager (as a page), etc. Alerts are provided in near real-time (e.g., accounting for processing and transmission time) to the outbound communication that is part of the behavior being observed.

A security incident may be cleared from storage in response to generating the alert and an analyst acknowledging/accepting the alert, an analyst taking remediation steps for the associated behavior, an analyst indicating that the security incident is a false positive (i.e., the behavior is benign despite being elevated), the detection model 120 noting the behavior becoming more common over a period of time, or the behavior not being seen again for a period of time and the security incident expiring.

Figure 2:
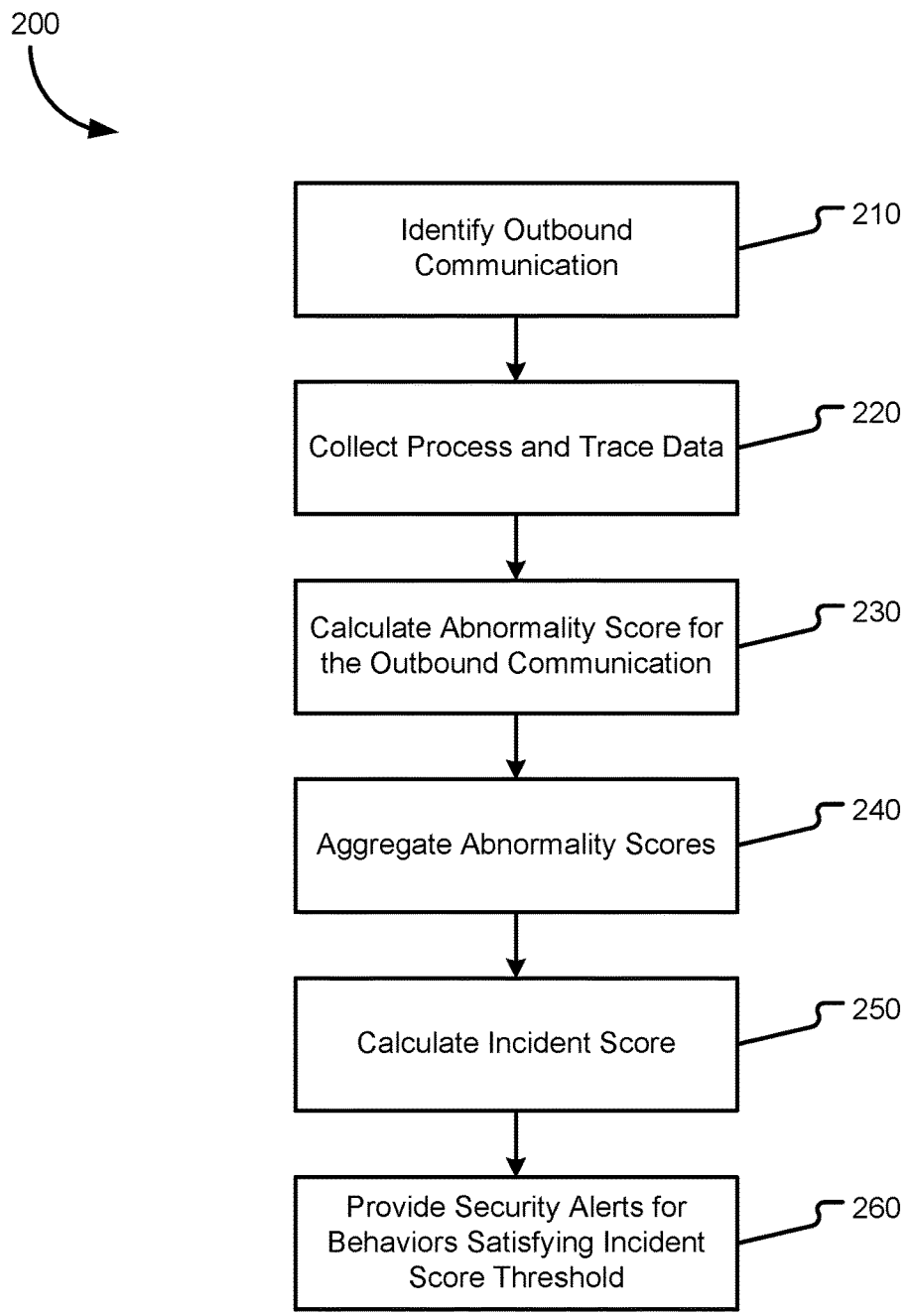
FIG. 2 is a flow chart showing general stages involved in an example method for detecting emergent abnormal behavior in a computer network.

FIG. 2 is a flow chart showing general stages involved in an example method 200 for detecting emergent abnormal behavior in a computer network, such as the online service 110. Method 200 begins with OPERATION 210, where an outbound communication is identified. In various aspects, packet sniffers may differentiate inbound communications and internal communication from outbound communications based on IP addresses in the destination field not being associated with IP addresses associated source devices 105. In other aspects, outbound communications are routed through a component or system (e.g., a firewall) before leaving the computer network, and are mirrored for identification or collection by an abnormality detection system 150.

Proceeding to OPERATION 220, method 200 collects event data including information related to the process that generated the outbound communication on the source device 105 and trace data for the communication signal. The process data include, but are not limited to, one or more of: an identifier for the user of the source device 105, a role of the source device, a name or other identified for the source device 105, an identifier for the active processes of the source device 105, and other information related to the source device 105 and initiating the outbound communication. The trace data include, but are not limited to, one or more of: a time of transmission of the outbound communication, an IP address of the destination device 115, a port on the destination device 115 to which the outbound communication is directed an identifier of the source device 105, and other information related to the outbound communication.

At OPERATION 230, the event information is fed into a detection model 120 to calculate an abnormality score for the outbound communication. Features from the population of previously observed outbound communications are used in comparison with the features of the current outbound communication to determine a probability of seeing a given pair of features in the current outbound communication. A population that is examined may be defined as those previously observed outbound communication that share a given feature with the current outbound communication to determine what percentage of that population also shares a second feature with the outbound communication. For example, when the current outbound communication includes features A, B, and C, the populations of previously observed outbound communications including feature A, B, or C may be examined to determine what percentage have an additional feature shared with the current outbound communication (e.g., n % of population [A] also include feature [B]). As will be appreciated, populations may be divided into subpopulations based on additional features (e.g., population [A] includes subpopulation [A, C]) for further analysis.

Method 200 proceeds to OPERATION 240, where the abnormality score for the outbound communication is aggregated with the abnormality scores for other outbound communications directed to the same destination device 115 (e.g., based on IP address). Aggregated abnormality scores group together the abnormality scores and features related to several outbound signals directed to the same device 115. The previously observed abnormality scores and associated event data are stored, in some aspects, in a rolling time window, such that earlier events and their scores are aged out of the rolling window. These scores and the populations of various events are fed into the detection model 120 to update and develop a view of the behavior in the online service 110 that is frequent so that abnormal behaviors can be identified. A rolling window allows the detection model 120 to use events occurring within a set time period from the current time to inform its view of currently observed events and behaviors in the online service 110.

At OPERATION 250, an incident score is calculated for the behavior of the outbound communication. The incident score is calculated based off of the previously aggregated abnormality scores and prior event data such that the highest aggregated abnormality score for communicating with a given destination device 115 is used as a baseline and modified by various spreadness features of the behavior related to the outbound communication, indicating how widespread the given behavior is for the computer network. As large groups of devices are expected to behave similarly when operating properly, and to behave abnormally when under the control of a malicious party, greater values of the spreadness features will inhibit the incident score from satisfying the incident threshold more strongly than lesser values of the spreadness features.

Examples of spreadness features identified from the prior event data include, but are not limited to: a number of ports observed in communication with the destination device 115, a number of unique source devices 105 observed in communication with the destination device 115, and a number of unique processes observed in communication with the destination device 115. In one aspect, a constant raised to the negative exponent of the spreadness factor (e.g., $2^{-(spreadness\ factor)}$) is added to the highest aggregated abnormality score, so that as the value of the spreadness factor increases (indicating a more widespread behavior), its effect on the incident score decreases.

Method 200 then proceeds to OPERATION 260, where the incident score calculated in OPERATION 250 is compared against an incident threshold. When the incident score satisfied the incident threshold, an alert is generated for the behavior of the outbound communication and provided to an analyst or other administrative user. In various aspects, the alert is transmitted as a text message (Short Message Service or Multimedia Message Service), email message, page, an application message in a SIEM application, or in another format. Method 200 may then conclude or continue identifying and classifying, in near real-time, behaviors associated with outbound communications as abnormal or normal.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types. As large groups of devices are expected to behave the same when operating properly and not under the control of a malicious party The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
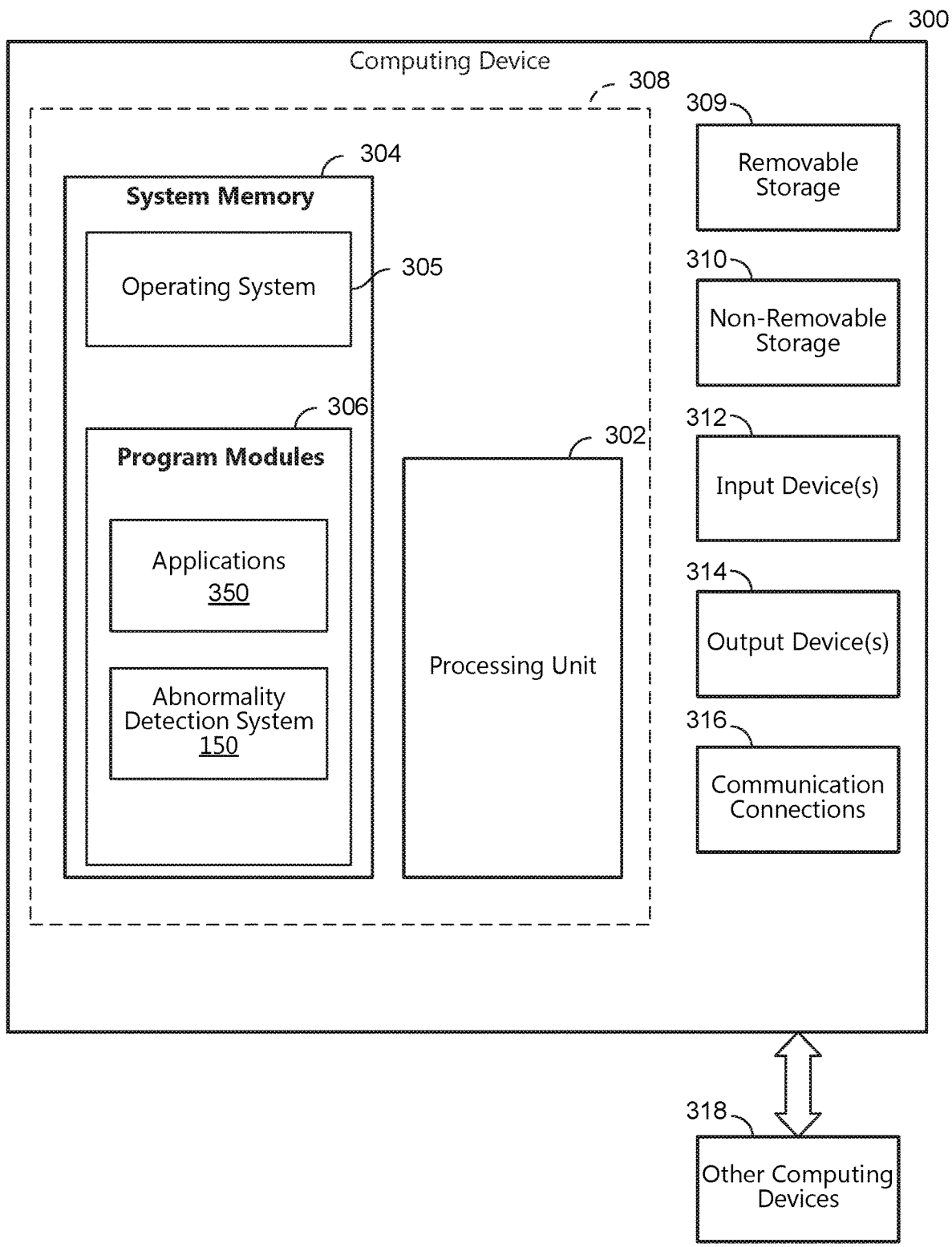
FIG. 3 is a block diagram illustrating example physical components of a computing device.
Figure 4A:
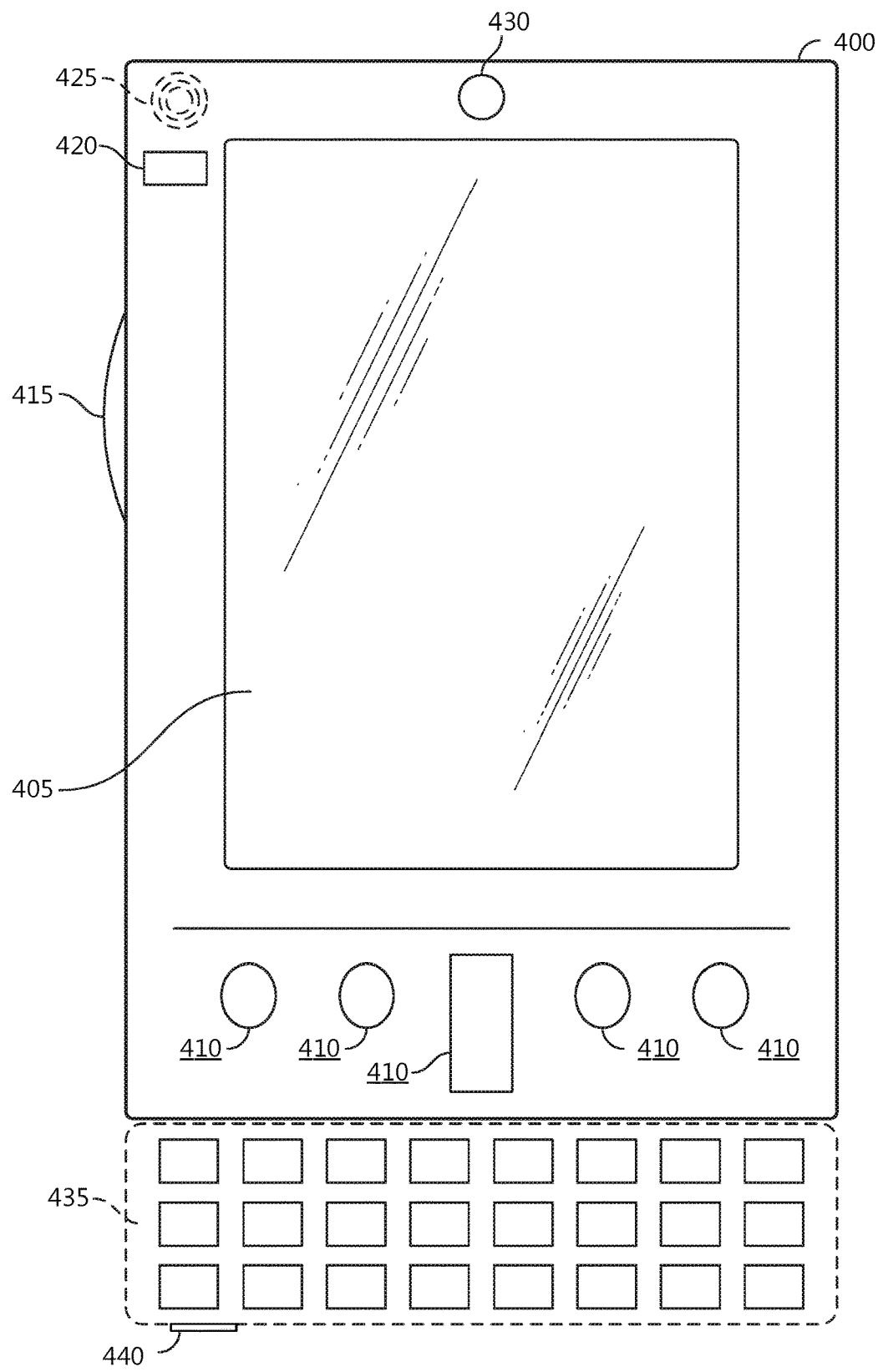
FIGS. 4A and 4B are block diagrams of a mobile computing device.
Figure 4B:
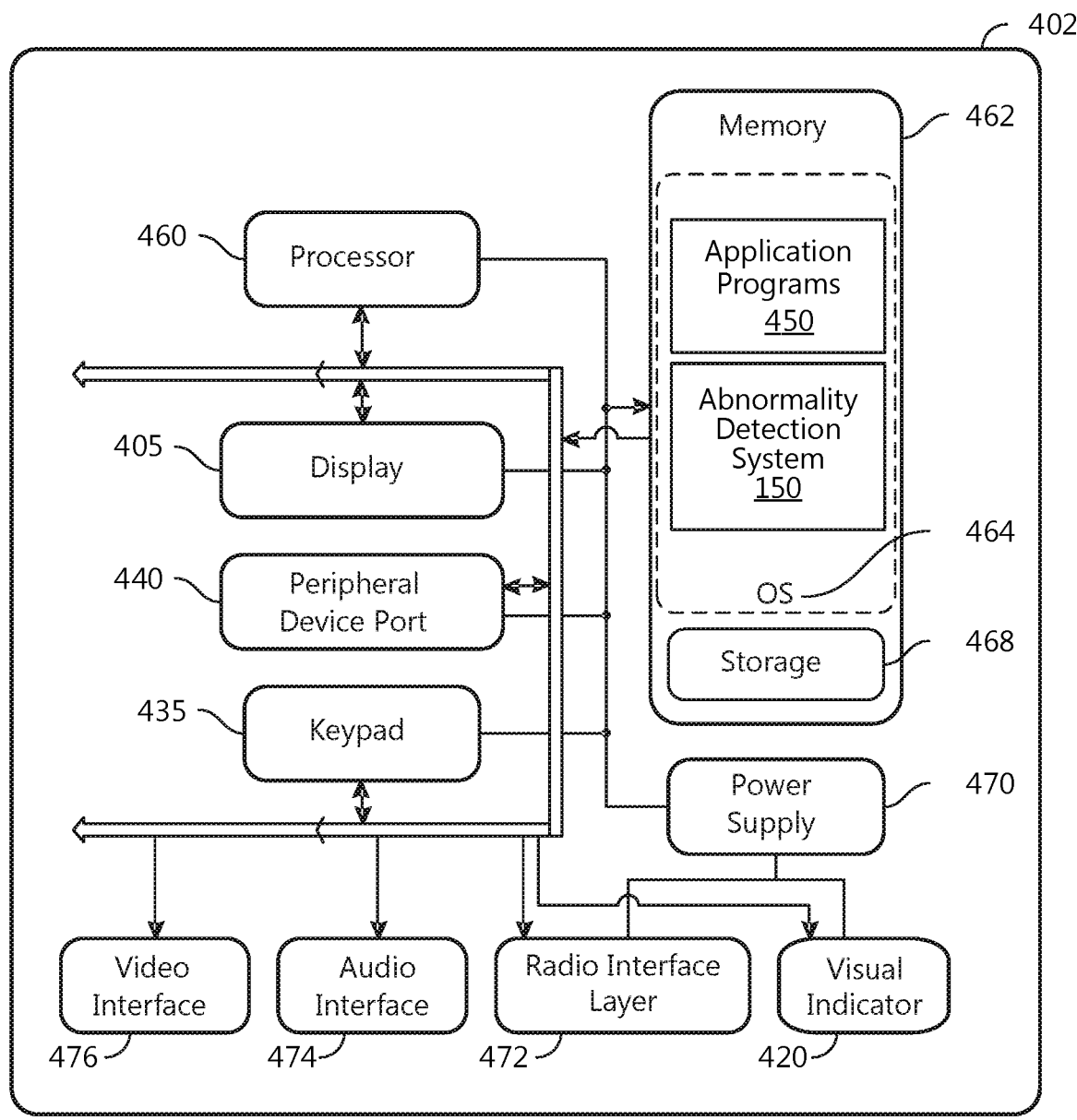

FIGS. 3-4B and the associated descriptions provide a discussion of a variety of operating environments in which examples are practiced. However, the devices and systems illustrated and discussed with respect to FIGS. 3-4B are for purposes of example and illustration and are not limiting of a vast number of computing device configurations that are utilized for practicing aspects, described herein.

FIG. 3 is a block diagram illustrating physical components (i.e., hardware) of a computing device 300 with which examples of the present disclosure may be practiced. In a basic configuration, the computing device 300 includes at least one processing unit 302 and a system memory 304. According to an aspect, depending on the configuration and type of computing device, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software applications 350. According to an aspect, the system memory 304 includes abnormality detection system 150. The operating system 305, for example, is suitable for controlling the operation of the computing device 300. Furthermore, aspects are practiced in conjunction with a graphics library, other operating systems, or any other application program, and are not limited to any particular application or system. This basic configuration is illustrated in FIG. 3 by those components within a dashed line 308. According to an aspect, the computing device 300 has additional features or functionality. For example, according to an aspect, the computing device 300 includes additional data storage devices (removable and/or non-removable) such as, for example, magnetic disks, optical disks, or tape. Such additional storage is illustrated in FIG. 3 by a removable storage device 309 and a non-removable storage device 310.

As stated above, according to an aspect, a number of program modules and data files are stored in the system memory 304. While executing on the processing unit 302, the program modules 306 (e.g., abnormality detection system 150) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 300 has one or more input device(s) 312 such as a keyboard, a mouse, a pen, a sound input device, a touch input device, etc. The output device(s) 314 such as a display, speakers, a printer, etc. are also included according to an aspect. The aforementioned devices are examples and others may be used. According to an aspect, the computing device 300 includes one or more communication connections 316 allowing communications with other computing devices 318. Examples of suitable communication connections 316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. According to an aspect, any such computer storage media is part of the computing device 300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a tablet personal computer, a laptop computer, and the like, with which aspects may be practiced. With reference to FIG. 4A, an example of a mobile computing device 400 for implementing the aspects is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. According to an aspect, the display 405 of the mobile computing device 400 functions as an input device (e.g., a touch screen display). If included, an optional side input element 415 allows further user input. According to an aspect, the side input element 415 is a rotary switch, a button, or any other type of manual input element. In alternative examples, mobile computing device 400 incorporates more or fewer input elements. For example, the display 405 may not be a touch screen in some examples. In alternative examples, the mobile computing device 400 is a portable phone system, such as a cellular phone. According to an aspect, the mobile computing device 400 includes an optional keypad 435. According to an aspect, the optional keypad 435 is a physical keypad. According to another aspect, the optional keypad 435 is a "soft" keypad generated on the touch screen display. In various aspects, the output elements include the display 405 for showing a graphical user interface (GUI), a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 400 incorporates peripheral device port 440, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 incorporates a system (i.e., an architecture) 402 to implement some examples. In one example, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA) and wireless phone.

According to an aspect, one or more application programs 450 are loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. According to an aspect, abnormality detection system 150 is loaded into memory 462. The system 402 also includes a non-volatile storage area 468 within the memory 462. The non-volatile storage area 468 is used to store persistent information that should not be lost if the system 402 is powered down. The application programs 450 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400.

According to an aspect, the system 402 has a power supply 470, which is implemented as one or more batteries. According to an aspect, the power supply 470 further includes an external power source, such as an AC adapter or a powered docking cradle that supplements or recharges the batteries.

According to an aspect, the system 402 includes a radio 472 that performs the function of transmitting and receiving radio frequency communications. The radio 472 facilitates wireless connectivity between the system 402 and the "outside world," via a communications carrier or service provider. Transmissions to and from the radio 472 are conducted under control of the operating system 464. In other words, communications received by the radio 472 may be disseminated to the application programs 450 via the operating system 464, and vice versa.

According to an aspect, the visual indicator 420 is used to provide visual notifications and/or an audio interface 474 is used for producing audible notifications via the audio transducer 425. In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. According to an aspect, the system 402 further includes a video interface 476 that enables an operation of an on-board camera 430 to record still images, video stream, and the like.

According to an aspect, a mobile computing device 400 implementing the system 402 has additional features or functionality. For example, the mobile computing device 400 includes additional data storage devices (removable and/or non-removable) such as, magnetic disks, optical disks, or tape. Such additional storage is illustrated in FIG. 4B by the non-volatile storage area 468.

According to an aspect, data/information generated or captured by the mobile computing device 400 and stored via the system 402 are stored locally on the mobile computing device 400, as described above. According to another aspect, the data are stored on any number of storage media that are accessible by the device via the radio 472 or via a wired connection between the mobile computing device 400 and a separate computing device associated with the mobile computing device 400, for example, a server computer in a distributed computing network, such as the Internet. As should be appreciated such data/information are accessible via the mobile computing device 400 via the radio 472 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method comprising:
identifying an outbound communication from a source device of a computer network to a destination device outside of the computer network;
collecting as event data, trace data from the outbound communication and process data from the source device;
calculating an abnormality score associated with the outbound communication based on a probability of seeing a first feature pair from the trace data or the process data when a second feature pair from the trace data or the process data is present in the outbound communication, the first feature pair including a first feature and a second feature and the second feature pair including a different first feature and a different second feature, the probability based on different outbound communications from the source device and further outbound communications from different source devices of the computer network to the destination device;
aggregating the abnormality score associated with the outbound communication with: abnormality scores associated with other outbound communications from the source device of the computer network to the destination device outside of the computer network, and
abnormality scores associated with further outbound communications from other source devices of the computer network to the destination device outside of the computer network;
based on the aggregation, producing an aggregated abnormality score associated with a behavior surrounding the outbound communication;
calculating an incident score in association with the aggregated abnormality score associated with the behavior based on how widespread the behavior is within the computer network;
comparing the incident score against an incident threshold, wherein satisfaction of the incident threshold indicates a likelihood that the source device is a compromised source device accessed by a malicious party, and the outbound communication to the destination device is associated with malicious behavior; and
in response to the incident score satisfying the incident threshold, causing a security remediation action.

2. The method of claim 1, wherein causing the security remediation action further comprises at least one of:
   quarantining the compromised source device; or
   providing a security alert related to the outbound communication.

3. The method of claim 2, wherein the security alert is provided in a Security Information and Event Management (SIEM) application.

4. The method of claim 1, wherein calculating the abnormality score further comprises:
   selecting the first feature pair from the trace data and the process data and the second feature pair from the trace data;
   determining for each of the first feature pair and the second feature pair the probability, based on the other outbound communications from the source device and the further outbound communications from the other source devices of the computer network to the destination device, of seeing the first feature pair when the second feature pair is present in the outbound communication; and
   aggregating the probability determined for the first feature pair and the second feature pair to produce the abnormality score.

5. The method of claim 4, wherein the first feature and the second feature of the first feature pair and the second feature pair include at least one of:
   a process generating the outbound communication;
   an Internet Protocol address associated with the destination device;
   a host associated with the destination device; or
   a role of the source device in the computer network.

6. The method of claim 1, wherein calculating the incident score further comprises:
   storing previously aggregated abnormality scores and prior event data;
   determining a highest aggregated abnormality score from the previously aggregated abnormality scores associated with the destination device;
   identifying spreadness features from the prior event data, including at least one of:
   a number of unique ports observed in communication with the destination device,
   a number of unique source devices observed in communication with the destination device, and
   a number of unique processes observed in communication with the destination device; and
   combining the spreadness features with the highest aggregated abnormality score associated with the destination device to produce the incident score, such that higher values for the spreadness features inhibit the incident score from satisfying the incident threshold.

7. The method of claim 6, wherein the previously aggregated abnormality scores and prior event data are stored in a rolling time window, wherein the previously aggregated abnormality scores and prior event data are aged out of the rolling time window based on a current time and an earliest time defining the rolling time window compared to a time at which the previously aggregated abnormality scores and prior event data were observed.

8. The method of claim 1, wherein the incident threshold is a percentile such that a portion of behaviors observed, corresponding to the percentile, are reported as security incidents.

9. The method of claim 1, wherein the trace data include:
   a time of transmission of the outbound communication;
   an Internet Protocol address of the destination device;
   a host information of the destination device;
   a port on the destination device to which the outbound communication is directed; and
   an identifier of the source device.

10. The method of claim 1, wherein the process data include:
    a process identifier associated with a process running on the source device that generated the outbound communication; and
    a user identifier associated with a user of the source device.

11. A system comprising a processor and a memory storage device including instructions that when executed by the processor provide:
    a detection model, configured to:
    receive event information related to an outbound signal from a source device within an online service to a destination device outside of the online service;
    determine a probability of whether the outbound signal is abnormal for the online service based on seeing a first feature pair from trace data or process data when a second feature pair from trace data or the process data is present in the outbound signal, the first feature pair including a first feature and a second feature and the second feature pair including a different first feature and a different second feature, the probability based on different outbound signals from the source device and the further outbound signals from different source devices of the online service to the destination device; and
    produce an abnormality score associated with the outbound signal based on the probability;
    an aggregated abnormality score cache, configured to:
    aggregate the abnormality score associated with the outbound signal with:
    abnormality scores associated with other outbound signals from the source device within the online service to the destination device outside of the online service, and
    abnormality scores associated with further outbound signals from other source devices within the online service to the destination device outside of the online service;
    based on the aggregation, produce an aggregated abnormality score for a behavior surrounding the outbound signal; and
    update the detection model based on the aggregated abnormality score; and a security incident cache, configured to:
    determine a greatest aggregated abnormality score in the aggregated abnormality score cache associated with a given behavior in the online service;
    identify spreadness features for the given behavior;
    generate an incident score associated with the given behavior based on a combination of the greatest aggregated abnormality score and the spreadness features;
    compare the incident score against an incident threshold, wherein satisfaction of the incident threshold indicates a likelihood that the source device is a compromised source device accessed by a malicious party, and the outbound signal to the destination device is associated with malicious behavior; and
    based on the incident score satisfying the incident threshold, in response to the incident score satisfying the incident threshold, causing a security remediation action.

12. The system of claim 11, wherein the detection model to determine the probability of whether the outbound signal is abnormal for the online service is further configured to:

identify a population of previously observed feature pairs that include the first feature observed for the outbound signal; and identify a number of the previously observed feature pairs of the population that include the second feature observed for the outbound signal.

13. The system of claim 12, wherein in response to a number of the previously observed feature pairs of the population falling below a population threshold, setting the probability to zero.

14. The system of claim 12, wherein in response to the outbound signal defining a first member of the population, debouncing the outbound signal.

15. The system of claim 11, wherein the spreadness features indicate how widespread the given behavior is for the online service, and greater values of the spreadness features inhibit the incident score from satisfying the incident threshold more than lesser values of the spreadness features when combined with the greatest aggregated abnormality score.

16. A computer readable storage device including processor executable instructions in a computer network, comprising:

identifying an outbound communication from a source device of the computer network to a destination device outside of the computer network;

collecting as event data, trace data from the outbound communication and process data from the source device;

calculating an abnormality score associated with the outbound communication based on a probability of seeing a first feature pair from the trace data or the process data when a second feature pair from the trace data or the process data is present in the outbound communication, the first feature pair including a first feature and a second feature and the second feature pair including a different first feature and a different second feature, the probability based on different outbound communications from the source device and further outbound communications from different source devices of the computer network to the destination device;

aggregating the abnormality score for the outbound communication with: abnormality scores associated with other outbound communications from the source device of the computer network to the destination device outside of the computer network, and abnormality scores associated with further outbound communications from other source devices of the computer network to the destination device outside of the computer network;

based on the aggregation, producing an aggregated abnormality score associated with a behavior surrounding the outbound communication;

calculating an incident score in association with the aggregated abnormality score associated with the behavior based on how widespread the behavior is within the computer network;

comparing the incident score against an incident threshold, wherein satisfaction of the incident threshold indicates a likelihood that the source device is a compromised source device accessed by a malicious party, and the outbound communication to the destination device is associated with malicious behavior; and in response to the incident score satisfying the incident threshold, in response to the incident score satisfying the incident threshold, causing a security remediation action.

17. The computer readable storage device of claim 16, wherein calculating the incident score further comprises:

storing previously aggregated abnormality scores and prior event data;

determining a highest aggregated abnormality score from the previously aggregated abnormality scores for the destination device;

determining incident features from the prior event data, including at least one of:
a number of unique ports observed communicating with the destination device,
a number of unique source devices observed communicating with the destination device, and
a number of unique processes observed communicating with the destination device; and combining the incident features with the highest aggregated abnormality score for the destination device to produce the incident score, such that higher values for the incident features inhibit the incident score from satisfying the incident threshold.

18. The computer readable storage device of claim 16, wherein calculating the abnormality score further comprises:

selecting the first feature pair from the trace data and the process data and the second feature pair from the trace data, wherein the first feature pair and the second feature pair are selected from a group comprising:
a process generating the outbound communication,
an Internet Protocol address associated with the destination device,
a host associated with the destination device, and
a role of the source device in the computer network;

determining for each of the first feature pair and the second feature pair a probability, based on the other outbound communications from the source device and the further outbound communications from the other source devices of the computer network to the destination device, of seeing the first feature pair when the second feature pair is present in the outbound communication; and aggregating the probability determined for the first feature pair and the second feature pair to produce the abnormality score.

19. The computer readable storage device of claim 16, wherein previously aggregated abnormality scores and prior event data are stored in a rolling time window, wherein the previously aggregated abnormality scores and prior event data are aged out of the rolling time window based on a current time and an earliest time defining the rolling time window compared to a time at which the previously aggregated abnormality scores and prior event data were observed.

20. The computer readable storage device of claim 16, wherein causing the security remediation action further comprises at least one of:
quarantining the compromised source device; or
providing a security alert related to the outbound communication.

* * * * *